United States Patent
Davies

[11] 3,720,219
[45] March 13, 1973

[54] FLUID LOGIC ARRANGEMENTS

[75] Inventor: Guy Edward Davies, Fareham, England

[73] Assignee: Plessey Handel und Investments A.G., Gartenstrasse, Switzerland

[22] Filed: Dec. 2, 1970

[21] Appl. No.: 94,328

[30] Foreign Application Priority Data

Dec. 4, 1969 Great Britain.....................59,170/69

[52] U.S. Cl..............................137/804, 73/136 A
[51] Int. Cl................................................F15c 1/12
[58] Field of Search........137/81.5; 64/2; 73/99, 136, 73/136 A

[56] References Cited

UNITED STATES PATENTS

| | | | |
|---|---|---|---|
| 3,587,305 | 6/1971 | Parkinson et al. | 73/136 A |
| 3,513,710 | 5/1970 | Bates et al. | 137/81.5 X |
| 3,559,665 | 2/1971 | Davis et al. | 137/81.5 X |
| 3,578,108 | 5/1971 | McConnell | 137/81.5 X |
| 3,363,595 | 1/1968 | Brandriff et al. | 137/81.5 X |

FOREIGN PATENTS OR APPLICATIONS 1,145,304  3/1969  Great Britain.....................137/81.5

Primary Examiner—William R. Cline
Attorney—Blum, Moscovitz, Friedman & Kaplan

[57] ABSTRACT

A fluid monitoring arrangement for giving a warning of deterioration or failure in a drive system which will maintain a required drive in spite of said deterioration or failure. The deterioration or failure is indicated by relative movement between two parts of the drive system, each part having associated with it an intermittent supply of fluid. The fluid is supplied to fluid logic means and the fluid logic means provides an output indicative of the relative movement of the two parts and hence of any failure or deterioration in the system.

10 Claims, 4 Drawing Figures

PATENTED MAR 13 1973 3,720,219

FLUID LOGIC ARRANGEMENTS

This invention relates to a fluid monitoring arrangement for giving a warning of deterioration or failure in a drive system, which drive system will maintain a required drive in spite of said deterioration or failure.

There are many types of drive systems for driving gear boxes and other types of equipment. Such drive systems may be operated through the use of driving shafts and/or driving gears. If, for example, wear should occur in a shaft, it may well be that the driving system will still continue to operate at a desired rate but the wear in the shaft will be getting worse all the time and such wear will be undetected until such time as the shaft may completely snap, in which case valuable time is lost in effecting a repair. With some drive arrangements such for example as continuous ring driving arrangements employing flexible drive shafts, the drive arrangement is constructed to operate at a desired rate even although one of the flexible drive shafts may be in a severe state of deterioration or may have completely failed. Again, the operation of the drive system does not indicate that one of the flexible shafts has become badly worn or has failed and the other shafts in the continuous ring arrangement may continue to operate under excessive load to make up for the worn or failed shaft. It will be obvious that after a period of time, the excessive load placed on the other shafts in the continuous ring arrangement will cause wear in these said other shafts and the whole drive arrangement may fail, requiring considerable replacement of parts.

It is an object of the present invention to provide a fluid monitering arrangement for giving a warning of deterioration or failure in a drive system of the type mentioned above. Accordingly, this invention provides a fluid monitoring arrangement for giving a warning of deterioration or failure in a drive system which will maintain a required drive in spite of said deterioration or failure, said deterioration or failure being represented by relative movement between first and second parts of the drive system, said fluid monitoring arrangement comprising in combination:

1. first means associated with said first part of the drive for providing a first fluid stream;
2. second means associated with said second part of the drive for providing a second fluid stream;
3. a first fluid flow conduit for carrying said first fluid stream;
4. a second fluid flow conduit for carrying said second fluid stream;
5. fluid logic means connected to said first and second fluid flow conduits for receiving said first and second fluid streams carried by said first and second fluid flow conduits respectively, said fluid logic means providing an output which is indicative of said relative movement; and
6. indicator means responsive to said fluid logic means and operable to indicate the occurrence of said relative movement, thereby to give a warning of said deterioration or failure in said drive system.

Preferably the drive system is a shaft drive system and in this case the relative movement between the said first and second parts of the drive system will be relative rotational movement.

In carrying out the invention the fluid logic means may comprise a first wall attachment device having a reference input and a control input, to which inputs the intermittent fluid streams are respectively applied, the output of said device being used for deriving an indication of the positional relationship between the two moving parts.

Preferably the fluid logic means will comprise a further wall attachment device connected in the output of the first wall attachment device, the output of said further wall attachment device being indicative of the positional relationship between the two moving parts. Conveniently the first wall attachment device may take the form of a biassed, bistable wall attachment device and the further wall attachment device may take the form of a bistable wall attachment device.

In one arrangement for monitoring the relative rotational movement between two rotating parts, the intermittent fluid streams may be derived from discs which are arranged to rotate with the parts being monitored, the discs having cut-outs therein for successively blocking and passing a fluid stream, e.g. of air, the intermittent fluid streams derived from said discs being fed to the reference and control inputs respectively, of the biassed bistable wall attachment device.

In a preferred arrangement according to the invention, the parts being monitored will form part of a flexible shaft drive arrangement comprising an input drive shaft for driving a plurality of gear-boxes, the gear-boxes being intercoupled by means of a plurality of flexible drive shafts so as to form a continuous ring.

In carrying out the invention according to the preferred arrangement two of said gear boxes may be arranged to drive discs individual thereto, an intermittent fluid stream being derived from each of said discs for feeding to the reference and control inputs of the biassed bistable wall attachment device.

An exemplary embodiment of the invention will now be described, reference being made to the accompanying drawings, in which.

Figure 1A:
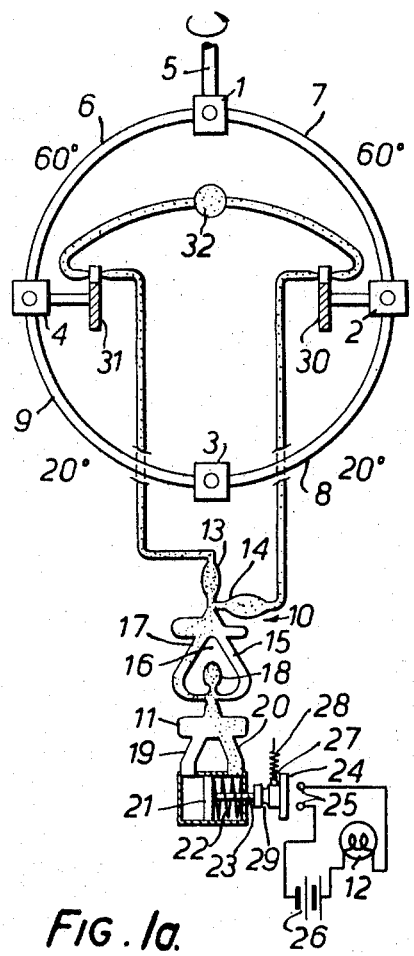
FIGS. 1a and 1b, show a fluid logic monitoring arrangement according to the present invention as applied to a flexible shaft drive arrangement, the two figures showing the arrangement in "normal" and "failed" conditions respectively.

In some applications, as for example in an aircraft, it may be required to cause say, four screw-jacks to be operated simultaneously to perform various actuation operations, each of the screw-jacks being driven by a single drive shaft. In FIG. 1 there is shown a drive arrangement whereby this may be accomplished. The arrangement consists of four bevelled gear-boxes 1, 2, 3 and 4, one of which is driven directly by an input drive shaft 5. Each of the gear-boxes 1 – 4 may have a screw-jack (not shown) associated therewith in well known manner. The gear boxes 1 – 4 are disposed in a circular array and circumferentially adjacent gear-boxes are intercoupled by means of flexible drive shaft 6, 7, 8 and 9 thereby affording a "continuous ring" drive arrangement. If it is assumed that each screw-jack and consequently each gear-box requires a predetermined torque to be exerted in order to cause it to operate, then due to the flexible nature of the flexible drive shafts, each shaft will be caused to be twisted, the angle of twist being dependent upon the driving torque. Considering first gear-box 3, this is driven by means of flexible drive shafts 8 and 9 from gear-boxes 2 and 4 respectively, the torque being equally distributed between the shafts, causing each of them, say, to be twisted 20°. Considering now gear-box 2, this is driven by flexible drive shaft 7 and the torque in this shaft must be sufficient to drive gear box 2 and also to provide the necessary torque to partially drive gear-box 3. Assuming each gear-box requires the same torque and the angle of twist of the flexible drive shafts is proportional to torque then the angle of twist of drive shaft 7 will be 60°. Similarly drive shaft 6 drives gear-box 4 and also partially drives gear box 3 and is also caused to be twisted by 60°. Thus, when the drive shaft 5 is rotated, each of the gear-boxes 1 – 4 is caused to be operated so actuating their associated screw-jacks (not shown).

After a considerable amount of use the flexible drive shafts deteriorate such that their torsional deflection or twist increases, and this causes the torque distribution around the drive "ring" to be changed. This is most easily seen if it is considered that one of the flexible drive shafts actually breaks, as is shown in FIG. 1b in which drive shaft 7 is shown to be broken. In this case gear-box 2 is driven from gear-box 3 which in turn is driven from gear-box 4. This results in the drive shaft 6, 9 and 8 being twisted due to the required driving torque by 120°, 80° and 40° respectively.

Figure 1B:
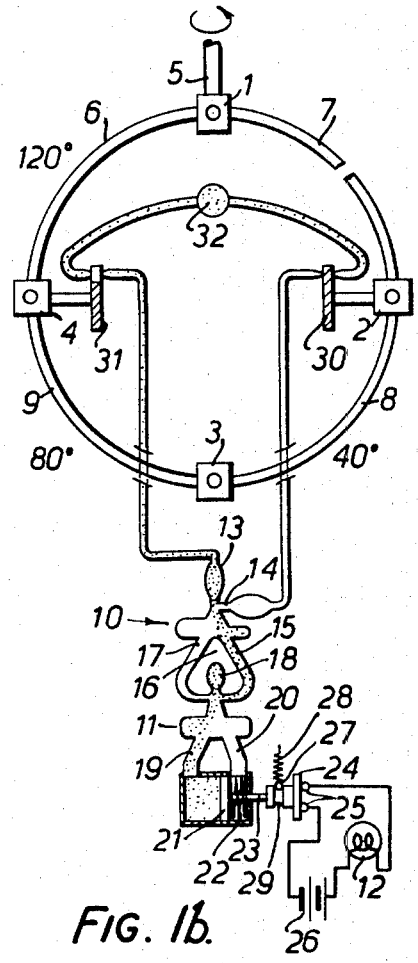

Now although the "continuous ring" driving arrangement shown in FIGS. 1a and 1b enable each of the gear boxes to be driven even though one of the flexible drive shafts may have broken, in practice it is desirable that a warning be given of a deterioration of one or more of the flexible drive shafts beyond an acceptable limit. In FIG. 1a and 1b there is shown a fluid logic monitoring arrangement for affording such as indication.

The fluid logic monitoring arrangement consists essentially of a biassed bistable wall attachment device 10 and a further bistable wall-attachment device 11 which drives a warning lamp 12. Suitable wall-attachment devices are described in British patent specification No. 1,145,304.

The biassed, bistable, wall-attachment device 10 is provided with a supply or reference port 13 and a control or set port 14. Due to the geometry of the device, in the absence of fluid in the set port 14 fluid supplied by the reference port 13 will pass down one side 15 of a center splitter 16. When a fluid jet is fed to the set port 14 immediately prior to the application of a fluid jet to the reference port 13, then the fluid supplied to the reference port 13 will be deflected so that it takes a path 17 on the other side of the splitter 16 and the fluid will continue to take this path even after the set fluid jet has been removed due to the so-called "wall-attachment" phenomena. Thus, if a reference fluid jet is applied first, this jet will be directed via path 17 whereas if a set fluid jet is applied first the reference fluid jet will be directed via path 16. The fluid in paths 15 and 17 is used to control a further bistable device 11 which is fed with a constant fluid supply via supply port 18, and which operates in a similar manner to the device 10 except that the device is not biassed, the fluid supply applied to the supply port 18 being caused to take one of two paths 19 or 20 in dependence upon the existence of fluid in the paths 15 or 17 of the device 10.

Thus, when fluid is flowing in path 17 of device 10, fluid from the supply port 18 of device 11 will be caused to take path 20 thereof (as shown in FIG. 1a) whereas when fluid is flowing in path 15 of device 10, fluid from the supply port 18 of device 11 will be caused to take path 19 thereof (as shown in FIG. 1b).

The fluid output via paths 19 and 20 of device 11 are used to operate a plunger type warning device, fluid from path 20 causing a plunger 21 to be moved towards the left to an unoperated condition as shown in FIG. 1a of the drawing and fluid from path 19 causing the plunger 21 to be moved towards the right against the pressure of a compression spring 22 to an unoperated condition as shown in FIG. 1b of the drawing.

The plunger 21 is provided with a shaft 23, to an enlarged diameter portion of which is connected a shorting bar 24 which in the operated condition of the plunger causes two electrical terminals 25 to be shorted, so completing the circuit of a warning lamp 12 and a battery 26. Thus, when the plunger 21 is moved to the operated condition the warning lamp 12 is caused to light up. The arrangement is also provided with a detent mechanism to hold the plunger in the operated position, the detent mechanism consisting of a spring-urged ball 27 which bears against the enlarged diameter portion of the shaft 23 under the pressure of a compression spring 28, the ball 27 engaging with a circumferential groove 29 in the enlarged diameter portion of the shaft 22 when the plunger 21 is in the operated condition.

Figure 2A:
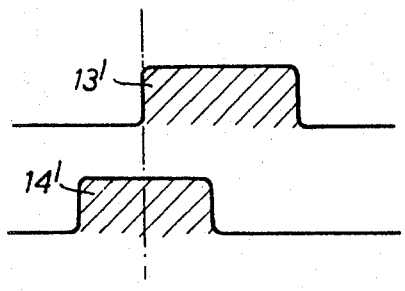
FIGS. 2a and 2b, show the disposition of the fluid stream pulses in the arrangements of FIGS. 1a and 1b respectively.

In order to use the fluid logic devices just described as a monitor, it is arranged that the reference and set fluid jets applied to the reference and set ports respectively of the device 10 be derived from discs 30 and 31 which are arranged to be individually driven by two of the gear boxes 2 and 4 forming part of the drive arrangement. Each of the discs 30 and 31 is provided with a number of cut-outs and is arranged to alternatively block and pass jets of fluid supplied from a supply 32. The intermittent fluid jet streams are then fed to the reference and set ports 13 and 14 respectively of the wall-attachment device 10. Initially, when the drive arrangement is operating the cut-outs in the discs 30 and 31 are arranged relative to one another so that a fluid pulse 14' is applied to the set port 14 of device 10 before a fluid pulse 13' is applied to reference port 13 of the device. This is shown in FIG. 2a of the drawing. In this case then, the fluid pulse applied to the reference port 13 of the device 10 is deflected down path 17 and causes the fluid stream from supply 18 in device 11 to pass down path 20. This causes the plunger 21 of the warning device to be moved to the unoperated condition and the warning lamp 12 is not lit up.

Figure 2B:
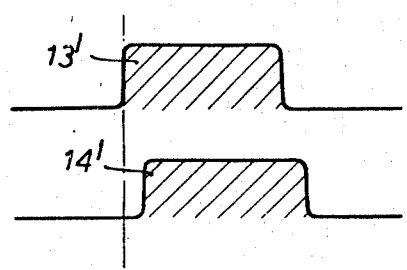

If, however the angle of twist of one or more of the shafts 6, 7, 8 or 9 of the drive arrangement change, as, for example when one of the shafts breaks, then the relative position between the cut-outs on the disc 30 and 31 will change until a point is reached when a fluid pulse 13' is applied to the reference port 13 of the device 10 before a fluid pulse 14' is applied to the set port 14, this is shown in FIG. 2b of the drawing. In this case the reference fluid pulse will, due to the biassed nature of the device 10, be directed down path 15, the fluid stream from supply 18 in device 11 will be directed down path 19 and the plunger 21 will be moved to the operated condition so lighting up the lamp 12. It may obviously be arranged that the warning mechanism be brought into operation before an actual break in a shaft takes place, the number and positioning of the cut-outs in the discs 30 and 31 being arranged accordingly.

Although the monitoring arrangement described is particularly advantageous when used for monitoring flexible drive shafts, it may also be used in other applications where relative movement is required to be monitored, e.g. for monitoring the twist occurring between extremeties of a driven shaft.

What we claim is:

1. A fluid monitoring arrangement for giving a warning of deterioration or failure in a drive system which will maintain a required drive in spite of said deterioration or failure, said deterioration or failure being represented by relative movement between first and second parts of the drive system, said fluid monitoring arrangement comprising in combination;
   1. first means associated with said first part of the drive for providing a first fluid stream;
   2. second means associated with said second part of the drive for providing a second fluid stream variable with respect to said first stream in relation to said relative movement;
   3. a first fluid flow conduit for carrying said first fluid stream;
   4. a second fluid flow conduit for carrying said second fluid stream;
   5. fluid logic means connected to said first and second fluid flow conduits for receiving said first and second fluid streams carried by said first and second fluid flow conduits respectively, said fluid logic means providing an output which is indicative of said relative movement; and
   6. indicator means responsive to said fluid logic means and operable to indicate the occurence of said relative movement, thereby to give a warning of said deterioration or failure in said drive system.

2. A fluid monitoring arrangement as claimed in claim 1, in which the fluid logic means comprises a first wall attachment device having a reference input and a control input, to which inputs the first and second fluid streams are applied, the output of said device being used for deriving an indication of said relative movement.

3. A fluid monitoring arrangement as claimed in claim 2, in which the fluid logic means comprises a further wall attachment device connected to the output of the first wall attachment device, the output of said further wall attachment device being indicative of said relative movement.

4. A fluid monitoring arrangement as claimed in claim 3, in which the first wall attachment device takes the form of a biassed, bistable wall attachment device and the further wall attachment device takes the form of a bistable wall attachment device.

5. A fluid monitoring arrangement as claimed in claim 4, for monitoring the relative rotational movement between said first and second parts, in which the first and second fluid streams are derived from discs which are arranged to rotate with the said parts, the discs having cut-outs therein for successively blocking and passing a fluid stream, the first and second fluid streams derived from said discs being fed to the reference and control inputs respectively of the biassed, bistable wall attachment device.

6. A fluid monitoring arrangement as claimed in claim 5, in which the first and second parts form part of a flexible shaft drive arrangement comprising an input drive shaft for driving a plurality of gear-boxes, the gear-boxes being inter-coupled by means of a plurality of flexible drive shafts so as to form a continuous ring.

7. A fluid monitoring arrangement as claimed in claim 6, in which each disc is driven by one of the gear boxes, a fluid stream being derived from each of said discs for feeding to the reference and control inputs of the biassed, bistable wall attachment device.

8. A fluid monitoring arrangement as claimed in claim 3 in which the further wall-attachment device comprises a movable plunger, said plunger being effective for controlling the operation of said indicator means.

9. A fluid monitoring arrangement as claimed in claim 8, in which the indicator means takes the form of a warning lamp.

10. A fluid monitoring arrangement as claimed in claim 1 in which said drive system is a shaft drive system, and in which said relative movement is relative rotational movement.

* * * * *